Figures 1, 2:
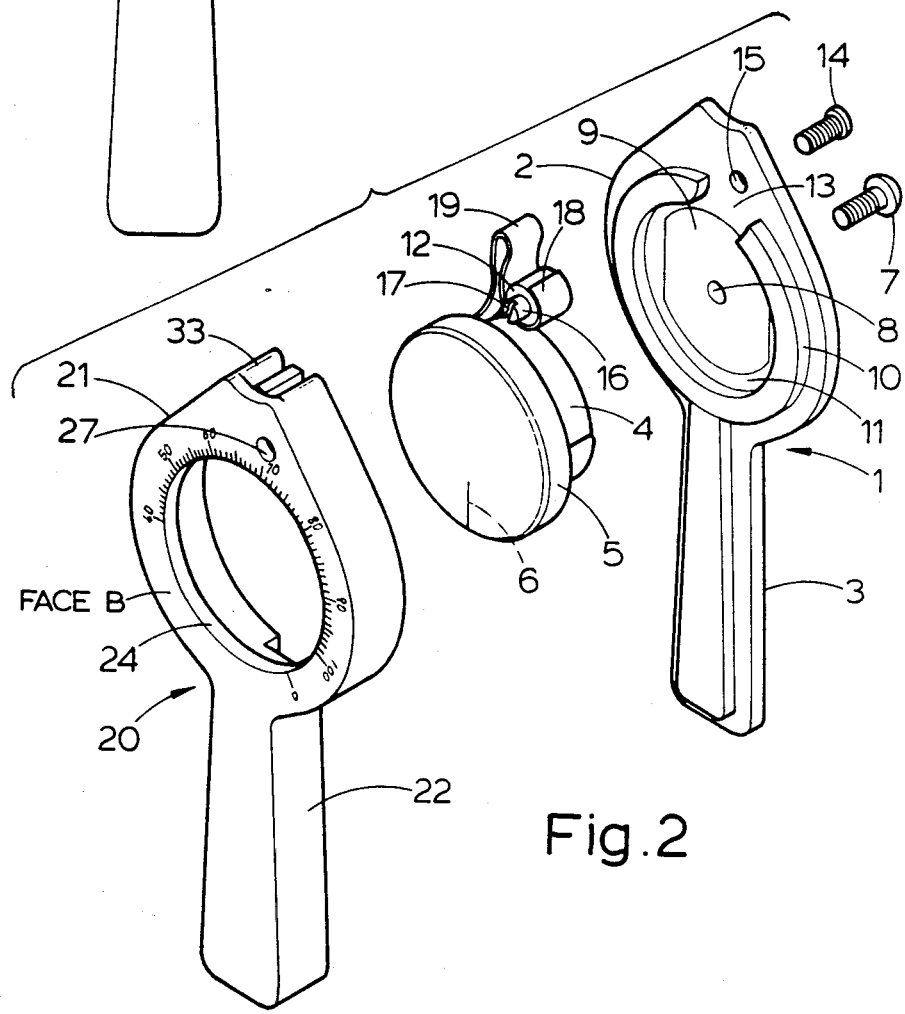

United States Patent [19]

Wakeling

[11] Patent Number: 4,569,139
[45] Date of Patent: Feb. 11, 1986

[54] CIRCUMFERENCE MEASURING DEVICE

[75] Inventor: Fitzgerald Wakeling, Raglan, Wales

[73] Assignee: Beecham Group p.l.c., England

[21] Appl. No.: 660,500

[22] Filed: Oct. 12, 1984

[30] Foreign Application Priority Data

Oct. 15, 1983 [GB] United Kingdom ............... 8327686

[51] Int. Cl.⁴ ............................................. G01B 3/10
[52] U.S. Cl. ...................................................... 33/179
[58] Field of Search .............................. 33/179, 176

[56] References Cited

U.S. PATENT DOCUMENTS

| | | | |
|---|---|---|---|
| 1,448,222 | 3/1923 | Johnston et al. | 33/179 |
| 1,978,682 | 10/1934 | Marvin | 33/179 |
| 2,129,582 | 9/1938 | Johansson | 33/179 |
| 3,639,995 | 2/1972 | Gardner | 33/179 |
| 3,744,140 | 7/1973 | Kyrk | 33/179 |

FOREIGN PATENT DOCUMENTS

| | | | |
|---|---|---|---|
| 818262 | 7/1949 | Fed. Rep. of Germany | 33/179 |
| 1594833 | 8/1981 | United Kingdom | 33/179 |

Primary Examiner—Willis Little
Attorney, Agent, or Firm—Jacobs & Jacobs

[57] ABSTRACT

A circumference measuring device comprising a flexible tape arranged to form a loop of adjustable size; indicating means comprising a scale and a reference mark movable with respect to one another, one end of the said tape being attached to the indicating means such that the indicating means measures the size of the loop; and zeroing means to preset the reference mark at a predetermined position with respect to the scale.

11 Claims, 5 Drawing Figures

CIRCUMFERENCE MEASURING DEVICE

This invention relates to a circumference measuring device and in particular to a device provided with a means to monitor and maintain its accuracy.

This invention has general utility in fields where circumference measurement is required but finds particular use in the measurement of diseased and/or inflamed joints; an accurate measurement of the size of joints affected by conditons such as arthritis being invaluable in investigations or courses of treatment wherein for example changes in joint size are correlated with specific treatment types.

Devices are known which comprise a looped flexible tape and means to measure the size of the loop. The maintenance of accuracy of measurement is a highly desirable feature of such devices. The commonest cause for loss of accuracy in previously known devices is the progressive stretching and deformation of the measuring tape with time due to normal wear and tear, and is consequently difficult to eliminate or even control.

The present invention relates to a device in which any variation in the measurement means can be corrected by a zero mechanism, which results in an improvement in accuracy.

Accordingly the present invention provides a circumference measuring device comprising a flexible tape arranged to form a loop of adjustable size; indicating means comprising a scale and a reference mark movable with respect to one another, one end of the said tape being attached to the indicating means such that the indicating means measures the size of said loop; and zeroing means to preset the reference mark at a predetermined position with respect to the scale.

A preferred form of the indicating means is a rotatable drum to which one end of the tape is attached which drum bears a reference mark, being movable with respect to a scale marked on a supporting body of the device. Alternatively the scale may be marked on a drum which is movable with respect to a reference mark on the body of the device.

In this embodiment of the invention, the zeroing means may be provided by having the scale or reference mark on the body being adjustably secured thereon, so that it can be fixed at a predetermined position. Preferably, however, the zeroing means is provided by one end of the tape being fixed to an adjustable securing means. The end of the tape may thereby be adjusted so that, when the size of the loop of tape is set to zero or to a known circumference, the reference mark is aligned against the corresponding position on the scale. Preferably the adjustable end of the tape is other than the end attached to the indicating means.

One preferred form of the adjustable securing means is provided by a restraining cylinder, around which the tape can be wound. The cylinder should be secured sufficiently firmly so as not to be rotatable by pulling the tape in using the device. The cylinder is capable of limited rotation in order to zero the device. The cylinder may be secured for example by a screw, or by frictional adhesion between the base of said drum and the body of the device. The limited rotation may be effected for example by a coaxial extension fixed to the top face of the drum and adapted for controlled rotation with a screw driver or allen wrench; or by the top face of the drum being similarly adapted.

A preferred method for effecting the limited rotation is provided by the coaxial extension being adapted for rotation by means of a screw driver.

Preferably barrier means are arranged to restrict lateral movement of the tape with respect to the cylinder. This will prevent the tape from looping back on itself within the body of the device.

The device may suitably be provided with an elongate handle, so that it may be held and operated by either hand.

Suitable construction materials for the main parts of the device of present invention include any light, durable and rigid material, for instance a thermosetting polymer. Preferred thermosetting polymers being acrylic resin or polystyrene.

Suitable construction materials for the tape include any strong, flexible and inelastic material.

Preferred materials include metals or polymers such as polyvinyl chloride, or glass fibre or carbon fibre.

Particularly preferred materials are glass fibre and carbon fibre having a coating of a polymer such as polyvinyl chloride or polytetrafluoroethylene.

Figure 3:
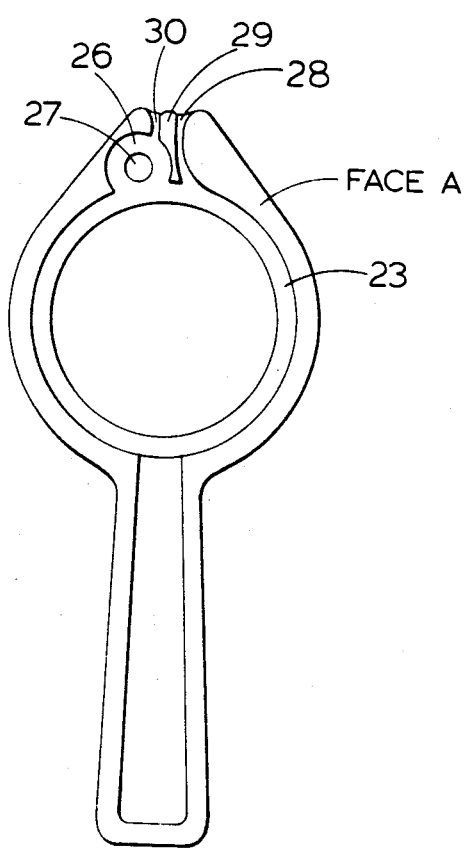
Figure 4:
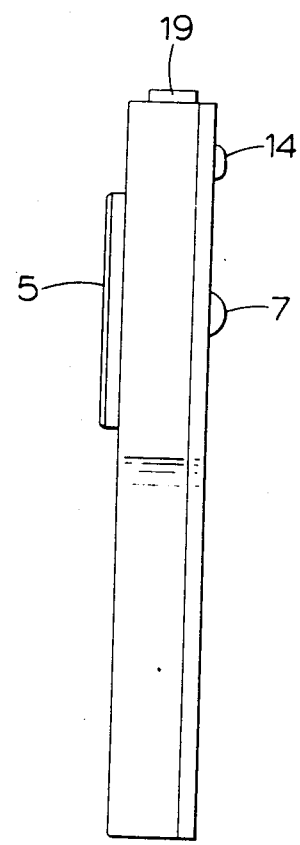
Figure 5:
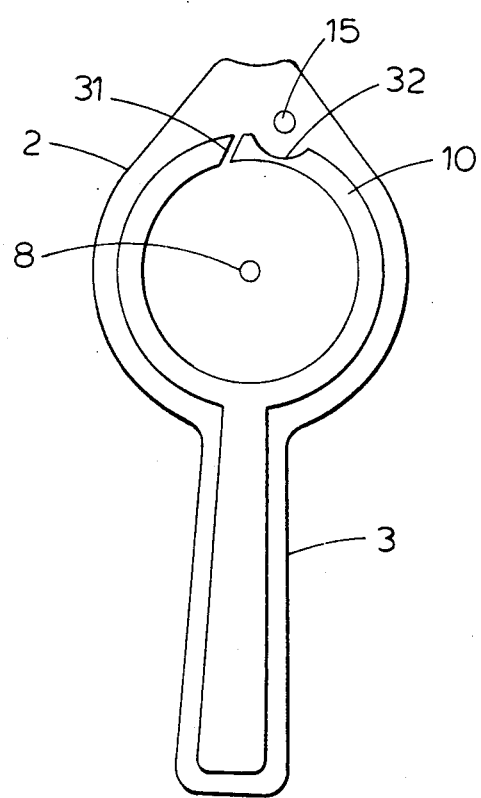

Devices embodying the invention will now be described by way of example with reference to the accompanying drawings in which:

FIG. 1 is a front elevation of the device;
FIG. 2 is an exploded view of the device;
FIG. 3 is a rear elevation of the casing of the device;
FIG. 4 is a side elevation of the device; and
FIG. 5 is front elevation of a base of another embodiment of the device.

The device (FIGS. 1 and 2) has a flat base 1 comprising an essentially pear shaped head 2 attached to an elongate handle 3. A drum 4 is coaxially fixed to a cylindrical cap 5 of slightly larger diameter than the drum 4; said cap 5 having a radially disposed reference mark 6 inscribed on its upper surface.

The drum 4, is rotationally attached to base 1 by means of a screw 7 which passes from the rear side of base 1 through aperture 8, a washer 9 and is retained into a screw threaded bore (not shown) in the back face of drum 4. Drum 4 is located on the head 2 within a circular raised ridge 10 integral with the head; 2 such that an annular channel 11 is formed between the drum 4 and the said ridge 10.

A cylinder 12, provided with a coaxial screw threaded bore in its back face, (not shown) is firmly attached to base 1 and is located within a gap 13 present in the circular ridge 10. Cylinder 12 is attached to base 1 by means of a screw 14 which passes from the rear side of base 1 through aperture 15 and into the screw threaded bore in the back face of cylinder 12. A coaxial, cylindrical peg 16 is securely fixed to the top face of cylinder 12. A diametrically disposed notch 17 is cut into the top face of peg 16: cylinder 12 may be rotated against the frictional adhesion between its lower surface and base 1 by inserting the blade of a screw driver into notch 17 and rotating in the required direction.

One end of a flexible tape 18 is attached to the outer surface of drum 4 by means of an adhesive and the other end is similarly attached to the outer surface of cylinder 12. The intermediate portion of tape 18 is wrapped around drum 4 within the confines of annular channel 11 and then tangentially leaves drum 4 by way of gap 13 doubling back on itself to form a loop 19 and then being wrapped around cylinder 12.

Preferably the annular channel 11 is sufficiently wide to allow free passage of the tape but not wide enough to allow the tape 18 to fold back on itself within the housing 20.

In an alternative embodiment (FIG. 5), the circular ridge 10 extends substantially across the gap 13, leaving a small slit 31 sufficient to allow the tape 18 to pass through. The external portion of the ridge 10 is provided with an arcuate recess 32 to accommodate the cylinder 12. This will assist in the prevention of any folding of the tape 18.

A housing 20 comprising head 21 and handle 22 portions and having the same plan view shape as base 1 fits over and forms a secure snap fit with base 1. When assembled, cap 5 on base 1 passes through an annular bore 23 provided in face A of head 21 and then through a second annular bore 24 provided in face B of head 21, bore 24 being coaxial and communicating with bore 23 but having a smaller radius. A graduated scale 25 is inscribed on face B around the perimeter of bore 24. Cylinder 12 and that part of tape 18 wound thereon extend into and form a firm fit with a bore 26, also provided in face A of head 21 and being parallel to and communicating with bore 23. The peg 16 passes through bore 26, and extends into a cylindrical aperture 27, provided in face B of head 21 extending just below the level of face B. The tape 18 extends from the housing 20 through channel 30, passes around stop 29 and reenters the housing 20 through a second channel 28 cut into the head 21 of housing 20.

In operation the present device may be held in either hand and the size of loop 19 may easily be adjusted by rotating cap 5 with the thumb. The calibration of the device may be zeroed by rotating cap 5 so that the zero mark of graduated scale 25 is aligned with reference mark 6; if tape 18 is not taughtly held against housing 2 then peg 16 is rotated with a screwdriver so that any slack tape 18 is rotated around cylinder 12. An alternative method of calibration would be provided by inserting a bar of known circular cross-section into loop 19 and then rotating cap 5 so that tape 18 is held firmly against an arcuate portion 33 of housing 20, peg 16 may then be rotated in conjunction with cap 5 until reference mark 6 is aligned with the required reading on scale 25.

In use, for example to measure the circumference of an arthritic finger joint, the finger is placed within loop 19 with the relevant joint resting against arcuate portion 33. Loop 19 is then drawn firmly around the joint by rotation of cap 5 and the circumference of the joint is then indicated by the position of reference mark 6 against graduated scale 25.

The principle advantage in use of the hereinbefore described device over earlier devices is that it provides a quick and simple means of checking its own accuracy. A further advantage of said device is that its operation requires little manual dexterity and it may be used in either hand; it may therefore be used by patients on themselves.

A further advantageous feature of the hereinbefore described device results in having the movement of the tape provided by a force applied to the smooth surface of a disc; it is therefore difficult to overtighten the measuring tape against a painfully inflammed or diseased joint.

I claim:

1. A circumference measuring device, comprising a base means a flexible tape arranged to form a loop of adjustable size; indicating means carried by said base means and comprising first and second members movable with respect to one another, one end of the said tape being attached to one of said members such that the indicating means measures the size of the loop and a scale and a reference mark is provided on said first and second members, respectively, and zeroing-means to preset the reference mark at a predetermined position with respect to the scale, said zeroing means comprising adjustable means secured to said tape for adjusting the length of tape between said reference mark and said adjustable securing means.

2. A device according to claim 1 wherein the tape is attached to the adjustable securing means at the end thereof remote from the indicating means.

3. A device according to claim 1 wherein the adjustable securing means comprises a restraining cylinder.

4. A device according to claim 2, wherein the restraining cylinder is adjustable by rotation thereof by means of a screw driver.

5. A device according to claim 1 wherein the zeroing means comprises the scale or reference mark of the indicating means being adjustably secured on said base means.

6. A device according to claim 1 wherein the indicating means comprises a rotatable drum means to which the said one end of the tape is attached.

7. A device according to claim 6 wherein barrier means are provided to restrict lateral movement of the tape relative to the rotatable drum means.

8. A device according to claim 6 wherein the reference mark of the indicating means is provided on the rotatable drum means.

9. A circumference measuring device, comprising a base means a flexible tape arranged to form a loop of adjustable size; indicating means carried by said base means and comprising a rotatable drum means to which one end of the tape is attached, and a scale carried by one of said base means and drum means, and a reference mark carried by the other of said means movable with respect to one another upon rotation of said drum, said indicating means being operable to measure the size of the loop; and zeroing means carried by said base means for presetting the reference mark before each use at a predetermined position with respect to the scale.

10. A device according to claim 9 wherein barrier means are provided to restrict lateral movement of the tape relative to the rotatable drum means.

11. A device according to claim 9 wherein the reference mark of the indicating means is provided on the rotatable drum means.

* * * * *